Figure 1:
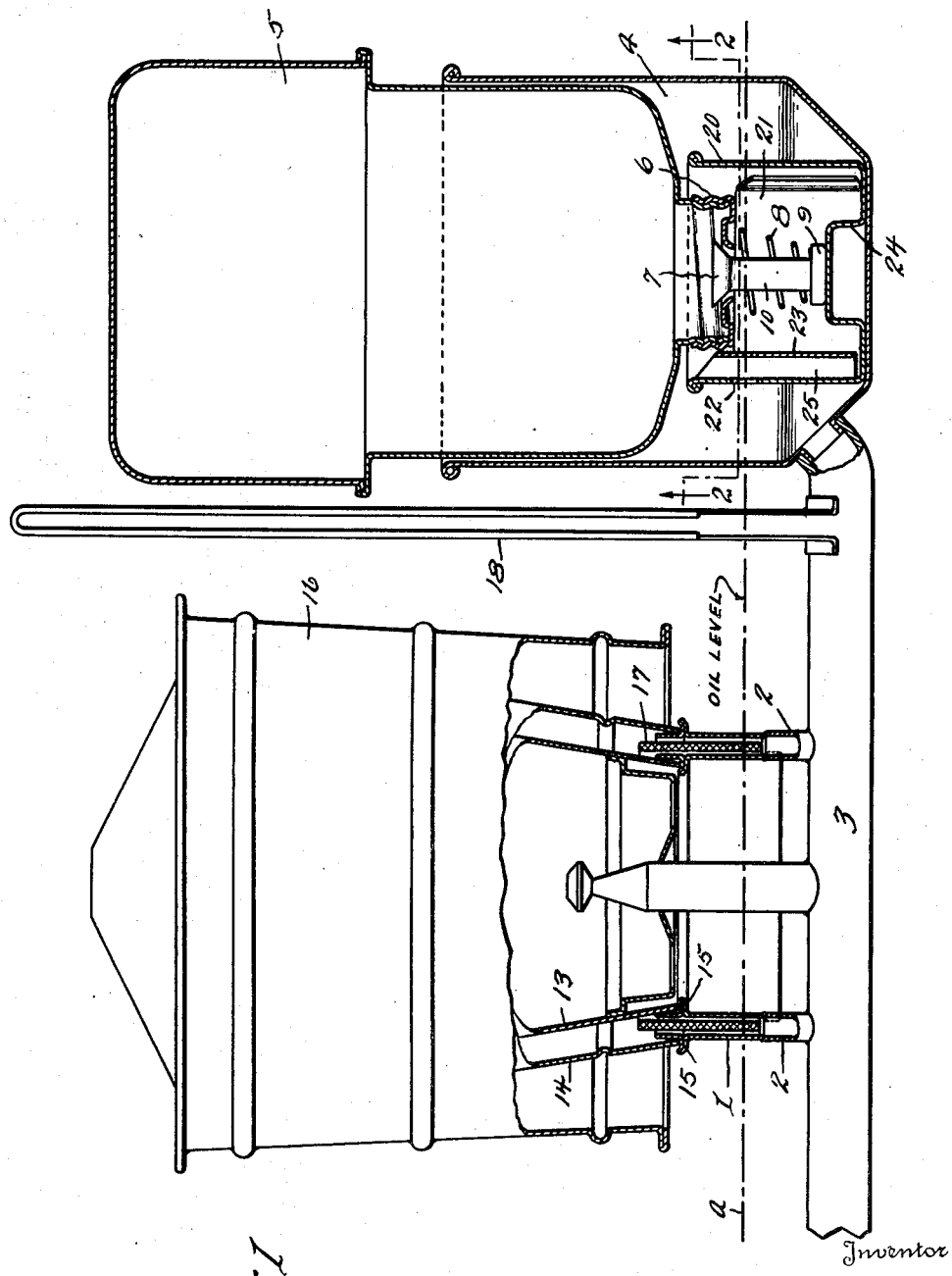

March 3, 1936.  K. W. RAUSCH  2,032,853
FLOW CONTROL
Filed Aug. 12, 1933  8 Sheets-Sheet 1

Inventor
Karl W. Rausch
By Hull, Brock albest
Attorney

March 3, 1936.  K. W. RAUSCH  2,032,853
FLOW CONTROL
Filed Aug. 12, 1933    8 Sheets-Sheet 2
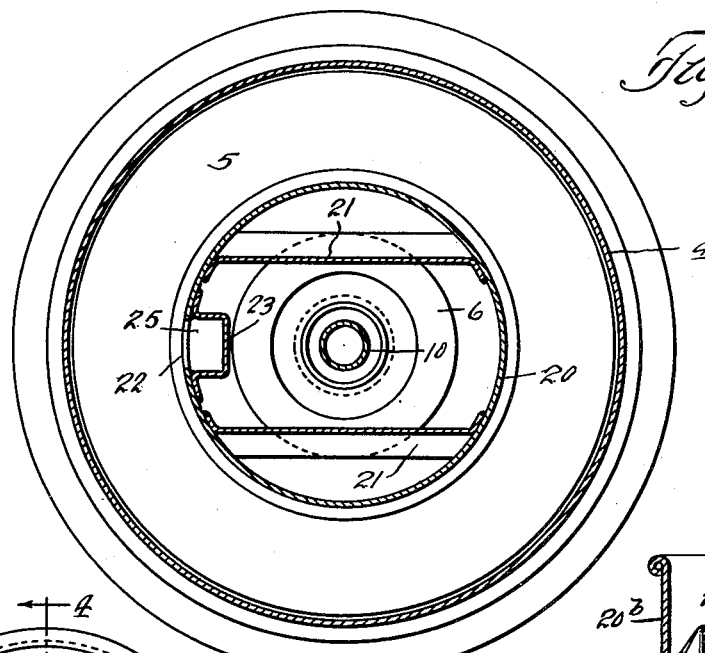
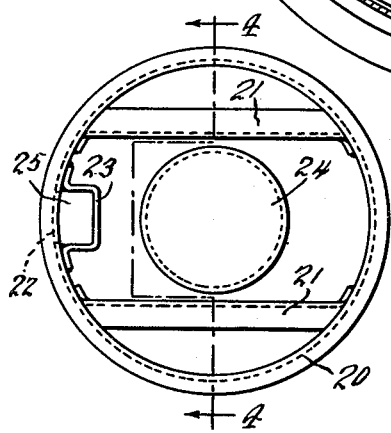
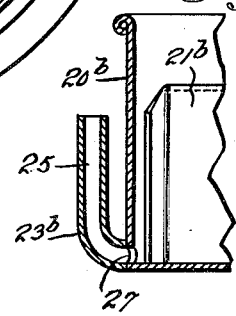
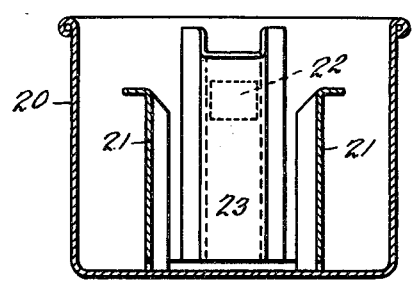
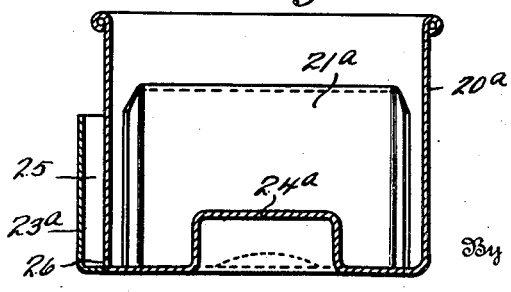
Inventor
Karl W. Rausch
By Hull, Brock Albert
Attorney March 3, 1936.   K. W. RAUSCH   2,032,853
FLOW CONTROL
Filed Aug. 12, 1933   8 Sheets-Sheet 3

Inventor
Karl W. Rausch
By Hull, Brock Albert
Attorney

March 3, 1936.　　　K. W. RAUSCH　　　2,032,853
FLOW CONTROL
Filed Aug. 12, 1933　　　8 Sheets-Sheet 4

Inventor
Karl W. Rausch
By Hull. Brock ablest
Attorney

March 3, 1936. K. W. RAUSCH 2,032,853
FLOW CONTROL
Filed Aug. 12, 1933 8 Sheets-Sheet 5

Inventor
Karl W. Rausch
By Huel. Brock olbert
Attorney

March 3, 1936. K. W. RAUSCH 2,032,853
FLOW CONTROL
Filed Aug. 12, 1933 8 Sheets-Sheet 6
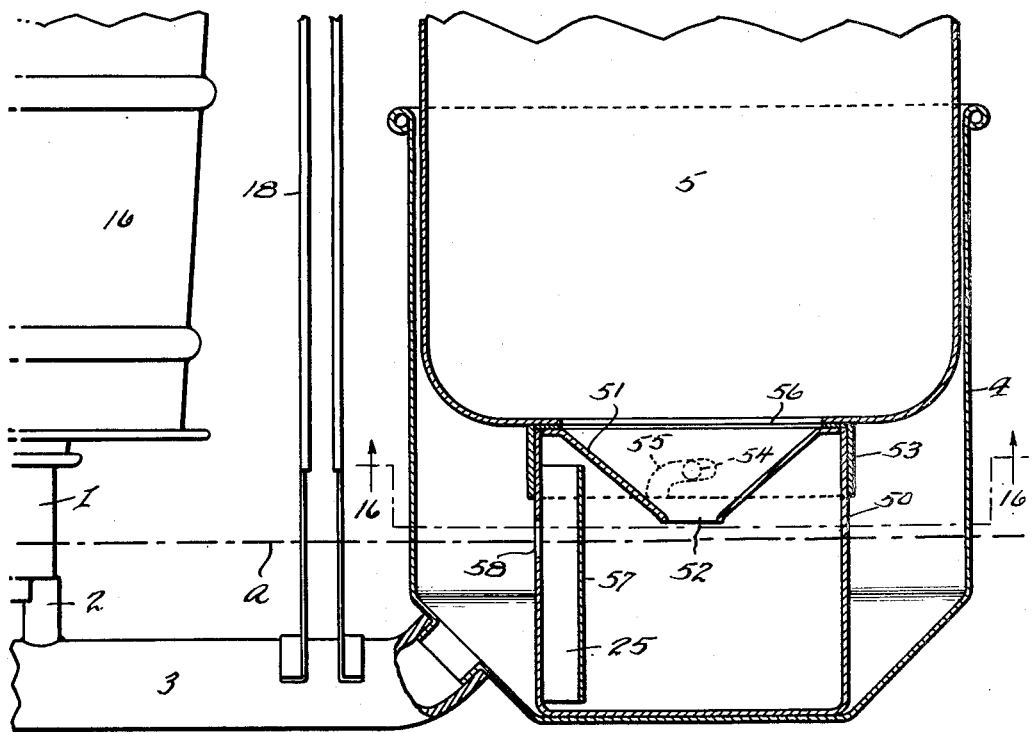
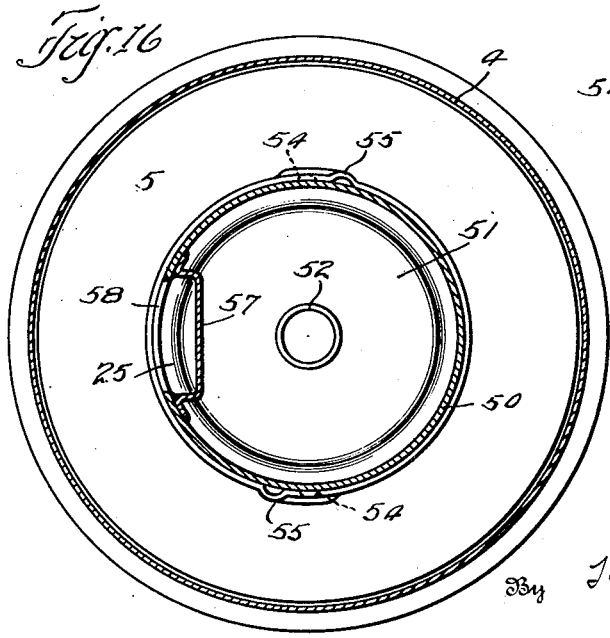
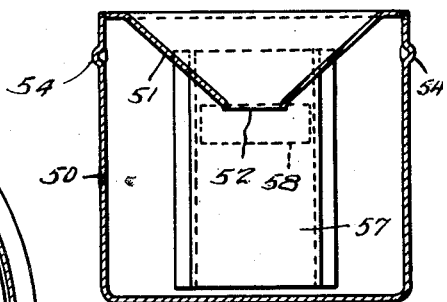

March 3, 1936. K. W. RAUSCH 2,032,853
FLOW CONTROL
Filed Aug. 12, 1933 8 Sheets-Sheet 7

Inventor
Karl W. Rausch
By Hull, Brock & West
Attorney

March 3, 1936.　　　K. W. RAUSCH　　　2,032,853
FLOW CONTROL
Filed Aug. 12, 1933　　　8 Sheets-Sheet 8

INVENTOR.
Karl W. Rausch
BY
Hull, Brock albert
ATTORNEY.

Patented Mar. 3, 1936

2,032,853

UNITED STATES PATENT OFFICE

2,032,853

FLOW CONTROL

Karl W. Rausch, East Cleveland, Ohio, assignor to Perfection Stove Company, Cleveland, Ohio, a corporation of Ohio

Application August 12, 1933, Serial No. 684,869

11 Claims. (Cl. 158—41)

Broadly, this invention consists of means for preventing the simultaneous feeding of two constituents of a liquid body that differ in specific gravity.

More limitedly, it consists of means for preventing or stopping the flow of a liquid, such as kerosene, when combined with a perceptible amount of a heavier liquid, such as water.

The invention had its conception in connection with the combustion device or burner set of an oil fired intermittent absorption refrigerating machine; but, as will be evident from the present disclosure, it is not limited to this particular association.

A combustion device of the kind referred to consists of commingling-tube burners to which oil is delivered, through a supply pipe, from a distributing receptacle over which a bottle-like reservoir is supported in inverted position—the same operating on the well known barometric or pigeon fount principle, thereby to maintain a constant oil level in said receptacle and in the burners. The particular type of burner in connection with which my invention originated includes a burner bowl in the nature of a relatively deep annular channel that is connected at diametrically opposite points to the supply pipe by means of feed tubes; and a so-called lighting ring, which is in the nature of a cylindrical asbestos wick, reposes within the burner bowl and projects a slight distance above the upper edge thereof to provide a vaporizing area to which the oil is fed by capillary attraction from below the oil level within the bowl. Supported above and in operative relation to the bowl are the perforated commingling tubes enclosed by a drum or chimney.

Burners of this character, particularly, are so adversely affected by water in the oil as to produce hazardous conditions, sometimes leading to serious fires; and in this connection it may be explained that it is not at all infrequent to find water in perceptible quantity in oil supplied for burners of this character.

It is not to be taken from the foregoing that difficulty arising from water in the oil is confined to the type of burner just described, because practically all kinds of oil burners perform more satisfactorily if the oil is free from water, and the invention may therefore be used to advantage with any type of oil burner that is in the least adversely affected by the presence of water in the oil.

My analysis of what causes the trouble in the type of burner first above described is as follows: the burner bowl becomes quite hot and the heat is conducted through the feed tubes to the main supply pipe so that the tubes and a part of the pipe reach a temperature above the boiling point of water. When even a small amount of water comes in contact with this highly heated zone the water flashes into steam that escapes through the feed tubes and blows the oil vapor, and in many cases drops of hot oil, up into the burner drums. At times the action is so violent as to blow the lighting ring out of the burner bowl. The oil thus thrown into the hot burner causes a high blaze, which may overheat the burner set, even to the inclusion of the fuel reservoir, and start a serious fire.

It is the specific purpose of my invention to provide means that will not allow oil to flow to the burner in the event that water is present in the oil to any appreciable extent. It may be pointed out in this connection that burner sets of refrigeration machines of the class above referred to are supplied with a quantity of oil at the beginning of each cycle of operation sufficient only to maintain a heating period by which such cycle is initiated, the burner automatically going out when the oil supply is exhausted. Therefore, at the conclusion of a cycle, the fuel system is practically devoid of oil, and when introducing a fresh supply any water that is present in the oil immediately settles to the bottom of the receptacle over which the reservoir is inverted; and, by virtue of my invention, as will hereinafter appear, this water, if it is of an appreciable quantity, will prevent the flow of oil to the burner, and not unless the water is of an uncommonly large amount, will the water itself overflow to the burner. In either of these events—that of the water preventing the flow of oil, or that of the water flowing ahead of the oil—the burner cannot be lighted until drained of the water. Thus the hazardous conditions above pointed out are avoided.

As mentioned at the beginning, the invention is not restricted to use with oil burners, but may be utilized wherever it is desirous of preventing simultaneous feeding of two constituents of a liquid body that differ in specific gravity. The invention, therefore, may be broadly defined as apparatus for delivering a selected liquid, including means for preventing the feeding of said liquid when it contains upwards of a given amount of a heavier liquid. The apparatus consists of a receptacle in which the liquid is maintained at a constant level, conveying means leading from said receptacle, and a riser duct in said conveying means having an inlet communicating with the receptacle at a point a substantial distance below said liquid level and having also a discharge or outlet opening that is below the said liquid level, the ratio of the vertical distance between said inlet and the discharge or outlet opening to the vertical distance between the inlet and the liquid level being equal to or greater than the ratio of the specific gravity of the lighter liquid to that of the heavier liquid.

So that the foregoing may be better understood, it may be explained that the invention is founded on the following phenomenon: kerosene, for example, is lighter than water, its specific gravity being .80. This means that a column of water 8 inches high will exert the same pressure as a column of kerosene 10 inches high. It follows, therefore, that if one arm or branch of a U-tube were supplied with water and the other with kerosene, the heights of the liquids would be in the ratio of 8 to 10, the kerosene, of course, being the higher. Now, if a U-tube whose arms are 9 inches long and 10 inches long, respectively, were supplied with kerosene through the 10-inch arm, the liquid would simply overflow the 9-inch arm. The same result would occur if water alone were supplied to the 10-inch arm. But should water be introduced with the kerosene in sufficient quantity to fill the shorter arm, the flow through the tube would cease and could only be resumed by removing the water. The constructions herein disclosed are based on this principle.

Figure 2:
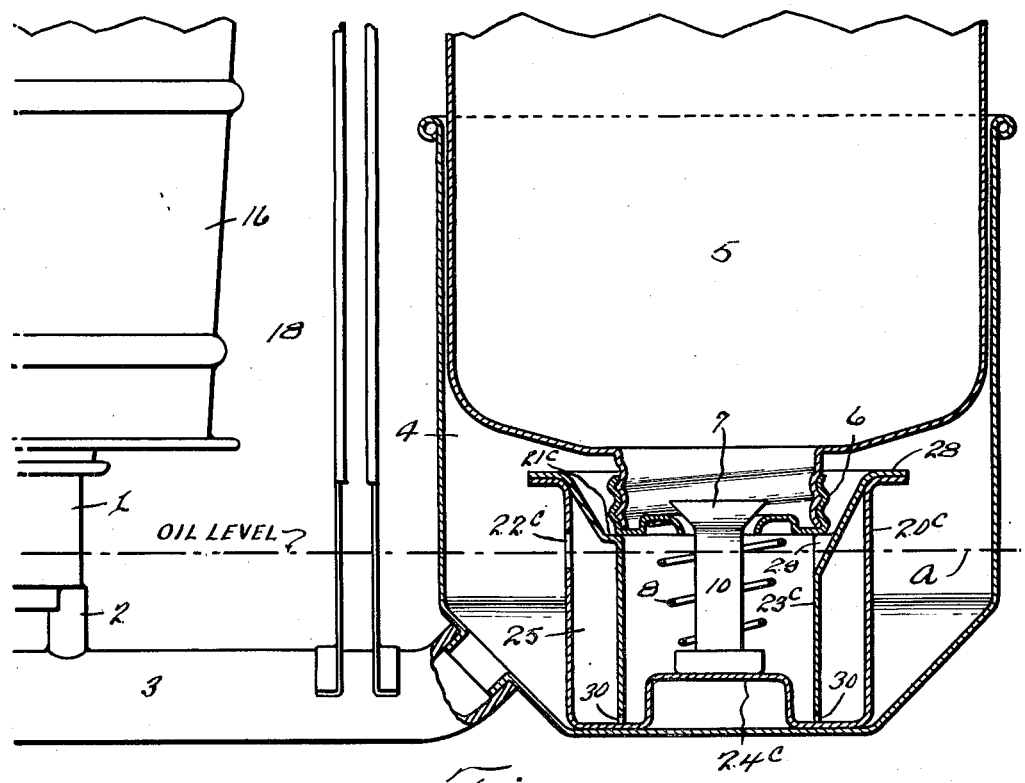
Figure 8:
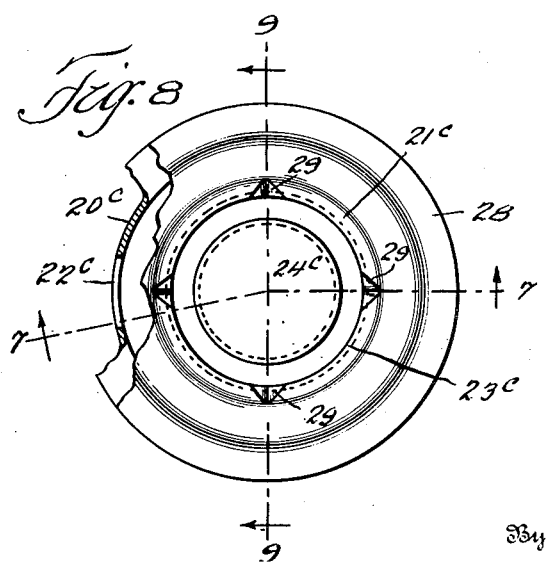
Figure 9:
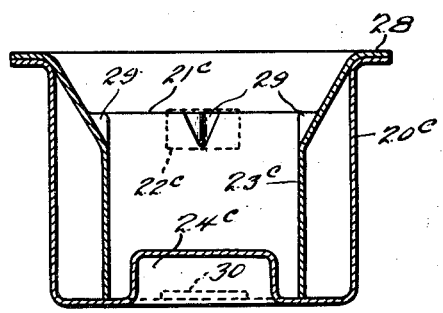
Figure 10:
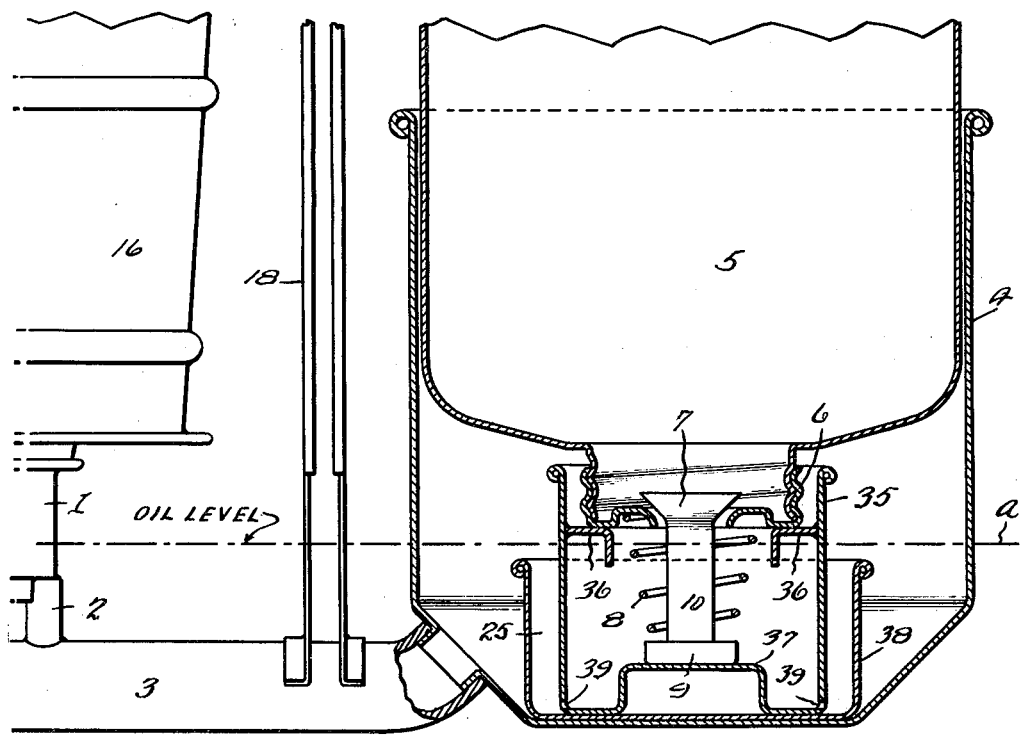
Figures 11, 12:
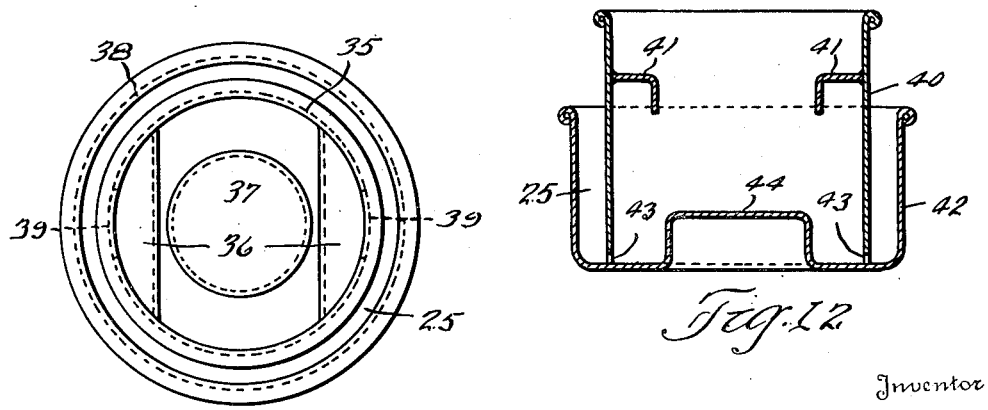
Figure 13:
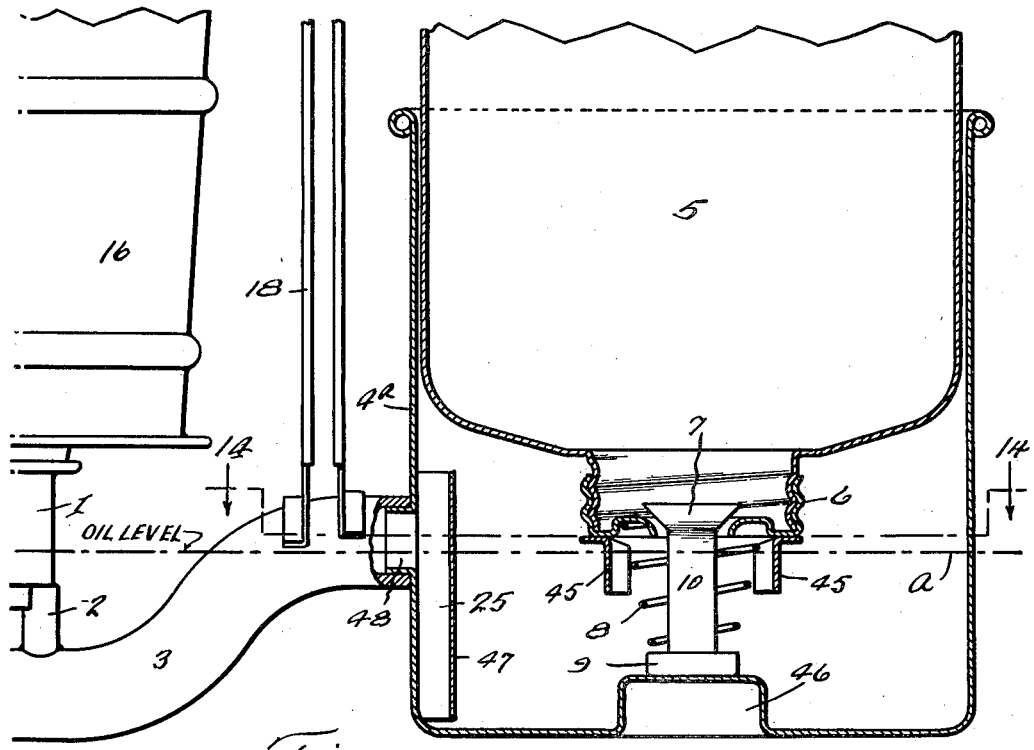
Figure 14:
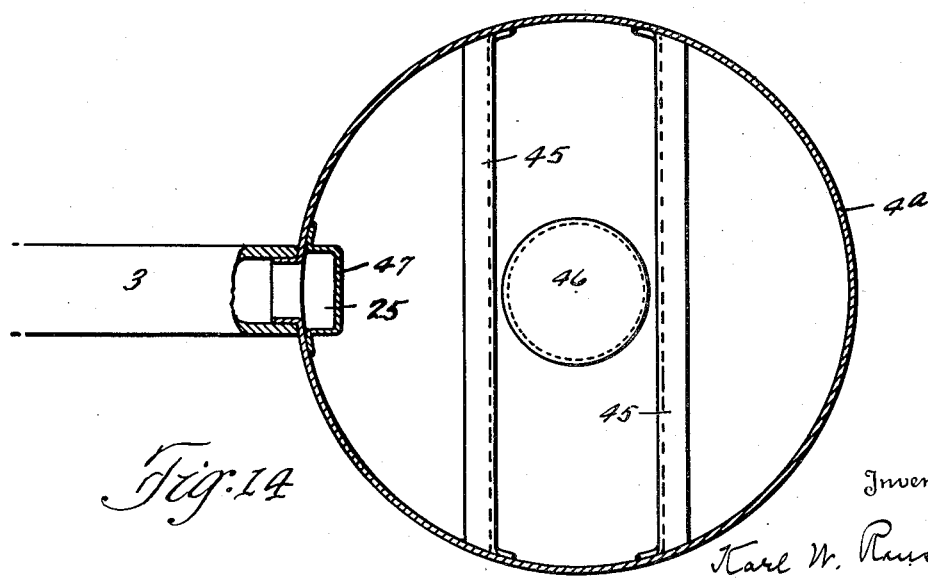
Figure 18:
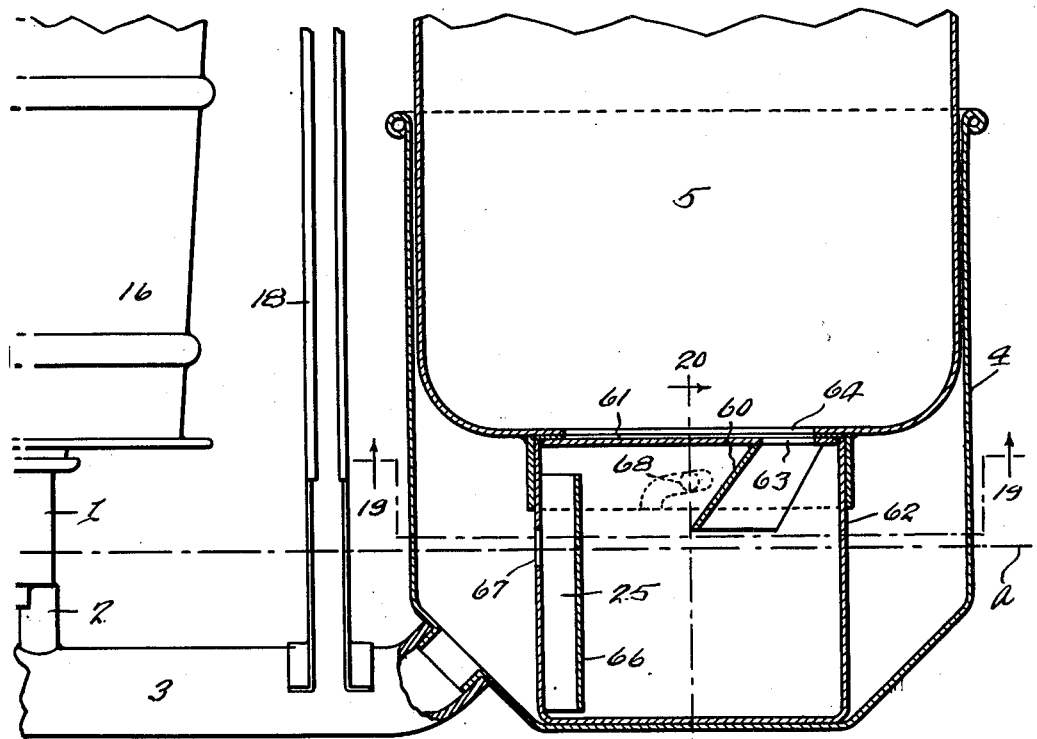
Figure 19:
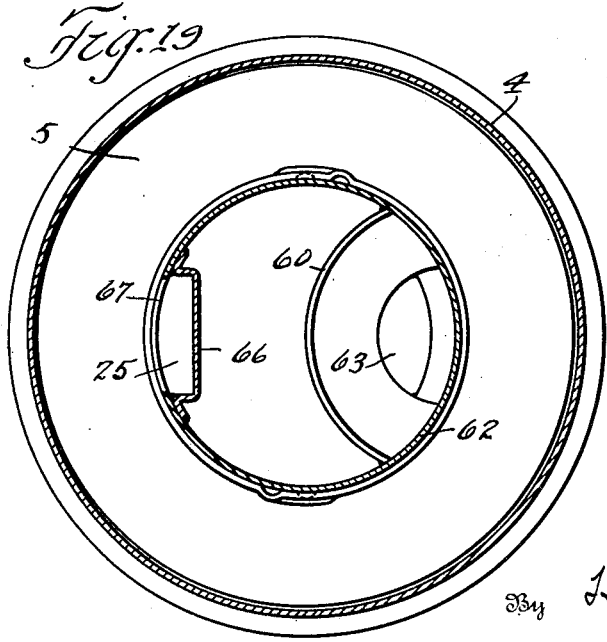
Figure 20:
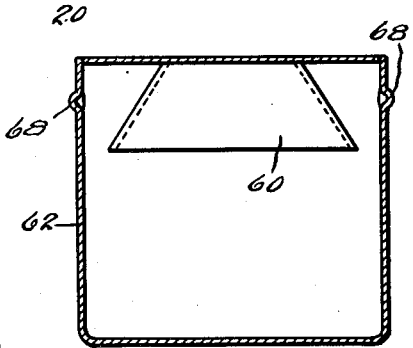
Figure 21:
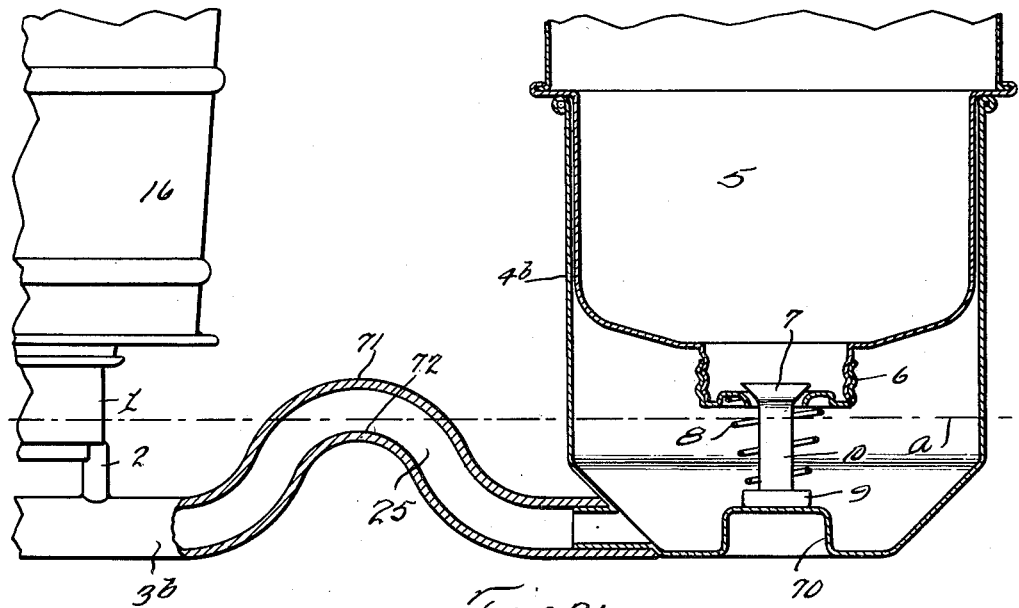
Figure 22:
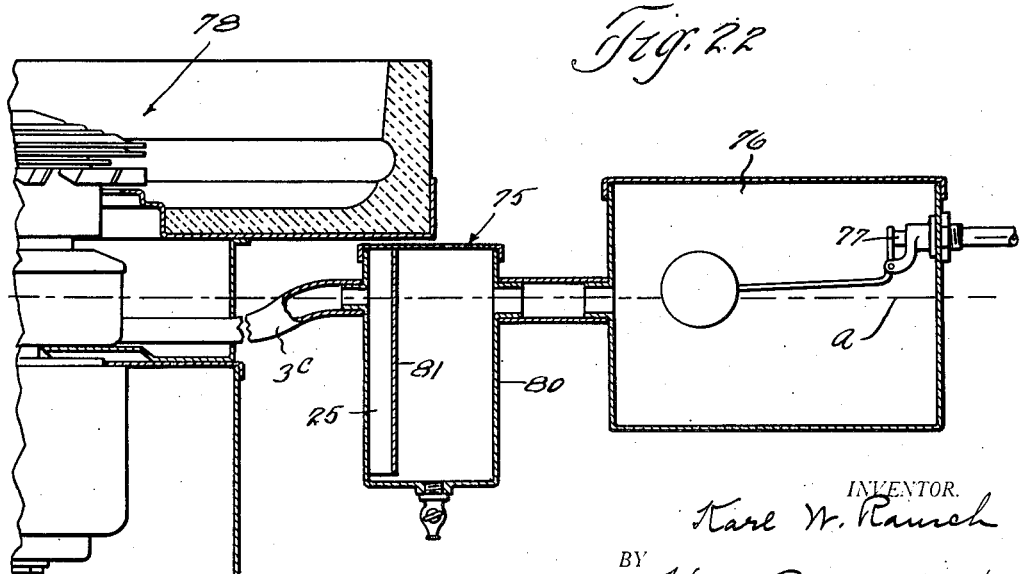

Objects and advantages additional to those hereinbefore mentioned will appear as I proceed to describe the several modifications of the invention illustrated in the accompanying drawings, wherein Fig. 1 is a fragmentary sectional side elevation of an oil burner set of an intermittent absorption refrigerator in which one form of the invention is incorporated; Fig. 2, on a somewhat larger scale, is a section substantially on the line 2—2 of Fig. 1, looking upward as indicated by the arrows; Fig. 3 is a plan view of the receptacle into which the reservoir discharges; Fig. 4 is a section on the line 4—4 of Fig. 3; Figs. 5 and 6 show modified forms of the receptacle; Fig. 7 is a fragmentary side view of a burner set, showing the reservoir and its associated parts in section and including a further modified form of the receptacle into which the reservoir discharges, the plane of section through said reservoir being indicated by the line 7—7 of Fig. 8; Fig. 8 is a plan view of the receptacle of Fig. 7, with parts broken away to disclose certain features; Fig. 9 is a section on the line 9—9 of Fig. 8; Fig. 10 is a view similar to Fig. 7 showing a modification wherein the receptacle into which the reservoir discharges is located within an overflow cup; Fig. 11 shows said receptacle and cup in plan; Fig. 12 shows a slightly different form of receptacle and overflow cup; Fig. 13 is a fragmentary sectional side elevation of a burner set showing a form of the invention in which the reservoir discharges directly into a distributing vessel applied to the supply pipe of the burner; Fig. 14 is a sectional plan on the line 14—14 of Fig. 13; Fig. 15 illustrates a form of the invention in which the receptacle that receives its oil supply from the reservoir is removably attached to and carried by the reservoir; Fig. 16 is a section on the line 16—16 of Fig. 15, looking upward; Fig. 17 is a transverse section through the receptacle disconnected from the reservoir, the view being at right angles to the plane of Fig. 15; Fig. 18 is a view similar to Fig. 15 showing another form of receptacle that is directly connected to the reservoir; Fig. 19 is a section on the line 19—19 of Fig. 18, looking upward; Fig. 20 is a transverse section through the receptacle, detached from the reservoir, the plane of section being indicated by the line 20—20 of Fig. 18; Fig. 21 shows a simplified form of the invention in which the reservoir discharges directly into the distributing vessel that is applied to the burner supply pipe and in which an upward bend in said pipe constitutes the riser, and Fig. 22 illustrates a further modification of the invention.

The combustion device or burner set, shown in part in several views of the drawings, constitutes no part of the present invention except as it enters generally, in some cases, into the combination thereof. Usually, a plurality of burners comprise a set. For the present purpose, but one is shown. In all views in which it appears the burner bowl is designated 1 and it is communicatively connected, by feed tubes 2, with a supply pipe 3. An open top vessel 4 is connected adjacent its lower end to the inlet end of the supply pipe, and a bottle-like reservoir 5 is adapted to be inverted thereover. As illustrated in Figs. 1, 7, 10, 13 and 21, a screw cap 6 is applied to the threaded neck of the reservoir and the same is equipped with a valve 7, biased toward closed position by a spring 8 that is interposed between the cap 6 and a head 9 on the valve stem 10. The parts are so proportioned that when the reservoir is supported in normal, inverted position within the vessel 4, the head of the valve stem engages an abutment 11 and lifts the valve from the seat that surrounds a central opening in the cap 6.

Inner and outer perforated commingling tubes 13 and 14, respectively, rest upon ledges 15 of the burner bowl and are enclosed by and are suitably connected to a drum 16. Reposing within the annular channel-like burner bowl is a lighting ring 17 of asbestos or the like whose upper end projects into the space between the commingling tubes 13 and 14. In a manner presently to appear, a liquid level is established within the oil distributing system, the same being indicated by the line a in certain of the views. As will be noted, this liquid level stands above the lower end of the lighting ring and, by capillary attraction, the fuel is delivered to the vaporizing area of the lighting ring 17 above the top of the burner bowl. To protect the reservoir 5 and the vessel 4 from heat radiated directly from the adjacent burner, a shield 18 is interposed between said parts, the same being shown as attached to the supply pipe 3.

In the form of the invention illustrated in Figs. 1 to 4, a cup-like receptacle 20 is disposed within the bottom of the vessel 4, and within this receptacle are supports 21 for the reservoir 5, the capped end of the reservoir bearing upon said supports. A discharge or outlet opening 22 is formed in the peripheral wall of the receptacle, and opposed to this opening on the inner side of the receptacle is arranged a channel-like partition member 23 whose lateral edges are connected to said wall and whose upper end is above the aforesaid liquid level while its lower end is spaced a slight distance from the bottom of the receptacle. As shown, said bottom is formed with a central reentrant portion 24 that constitutes the abutment that is arranged to be engaged by the head of the valve stem 10 for lifting the valve 7 from its seat when the reservoir 5 rests upon the supports 21.

When the reservoir is inverted over the distributing receptacle in the manner described, oil will flow therefrom until the reservoir becomes liquid sealed by an accumulation of liquid within the receptacle to about the level indicated by the line a. It is found that this level is somewhat below the discharge opening or mouth of the reservoir and that a neck of liquid, rising from the surface of that contained within the receptacle, converges to the mouth of the reservoir, such a formation resulting presumably from the surface tension of the liquid.

Applying, now, to the above detailed construction, the terms hereinbefore used in the broad definition of the invention, the part designated 20 constitutes the "receptacle" in which the liquid is maintained at a constant level; the "conveying means" that leads therefrom and communicates therewith at a point a substantial distance below the liquid level, includes the space between the partition 23 and the adjacent portion of the peripheral wall of the receptacle 20, the opening 22, the surrounding portion of the vessel 4 and the supply pipe 3, etc., the so-called "riser duct" in the conveying means being the aforesaid space, designated 25, between the partition 23 and the wall of the receptacle, while the "discharge" or outlet opening of the riser duct is formed by the lower edge of the opening 22.

When a reservoir is inverted over the receptacle 20, if it contains nothing but oil, the oil will accumulate within the receptacle until it overflows through the opening 22 and fills the system, including the burner bowl and all intercommunicating parts, to the level indicated by the line a. On the other hand, if water is present in the reservoir with the oil, it will instantly settle to the bottom of the receptacle, and if the level thereof is below or approximately at the lower end of the partition 23, the oil will escape past the stratum of water through the riser duct 25 and establish an oil level throughout the system in the manner aforesaid. However, should an appreciable amount of water be present with the oil in the reservoir when the latter is placed within the receptacle, the water will precede the oil up the riser duct 25 until it reaches an elevation therein somewhat below the discharge or outlet opening of the riser duct and, due to the difference in specific gravity between the water and oil, as hereinbefore explained, the oil within the receptacle will not exert sufficient pressure upon the water to cause the latter to overflow, in which case the presence of the water within the riser duct (and, of course, within the bottom of the receptacle 20 to a point somewhat above the lower edge of the partition 23) will prevent flow of the oil. Under these circumstances, the liquid conveying means beyond the riser duct 25 will remain devoid of oil so that the burner cannot be lit. To condition the burner for lighting it will be necessary to remove the reservoir and lift the receptacle 20 from the vessel 4 and empty it.

In case there was so much water present in the oil that it would overflow the riser duct 25, which would be very unusual, the burner could not be lit and, in this case, to condition it for lighting, the oil supply pipe and vessel 4 would have to be drained. The important safeguard provided by my invention results from the fact that water cannot follow oil to the burner and cause the serious effects hereinbefore pointed out by the flashing of such water into steam when it reaches the zone of intense heat in the regions where the feed tubes 2 join the supply pipe 3.

In the modification illustrated in Fig. 5, a member 23ª is placed on the outside of the peripheral wall of the receptacle 20ª as a substitute for the previously described partition 23, and the riser duct 25, enclosed between said member and the adjacent portion of the peripheral wall of the receptacle, communicates with the interior of the receptacle through an opening 26 and overflows over the top of said member.

In the modification illustrated in Fig. 6, the riser duct 25 is provided by a tube 23ᵇ that is connected to the peripheral wall of the receptacle 20ᵇ, adjacent the bottom of the receptacle, in register with a hole 27.

In the form of the invention illustrated in Figs. 7 to 9, the distributing receptacle 20ᶜ has a discharge or outlet opening 22ᶜ in its peripheral wall that leads from a riser duct 25 which extends entirely about an annular partition member or sleeve 23ᶜ that is flared outwardly at its upper end and terminates in a flange 28 that overlies the flanged perimeter of the receptacle 20ᶜ. An abrupt offset or shoulder is formed at the junction of the cylindrical and flared portions of the partition member 23ᶜ to provide a support 21ᶜ for the reservoir; and at intervals said support is formed with V-shaped depressions 29 that provide vents. The bottom edge of the partition member 23ᶜ is notched at 30 to allow ready communication between the interior of said partition member and the surrounding riser 25.

In the modification illustrated in Figs. 10 and 11, a receptacle 35, having reservoir supports 36 and an abutment 37 that is formed by a reentrant portion of its bottom wall, is disposed within an overflow cup 38, the space between said overflow cup and the receptacle 35 constituting the riser duct 25 that communicates with the interior of the receptacle through openings 39.

In the construction illustrated in Fig. 12, a cylinder 40, having reservoir supports 41, rises from the bottom wall of an overflow cup 42. The riser duct 25, between the peripheral wall of the overflow cup and the cylinder 40, communicates with the interior of the latter through notches 43, and the abutment for engagement with the valve stem is formed by a reentrant portion 44 of the bottom wall of the overflow cup. The cylinder 40 may or may not be soldered or otherwise connected to the bottom wall of the cup 42, according to preference.

In the form of the invention illustrated in Figs. 13 and 14, the vessel 4ª constitutes the receptacle into which the reservoir discharges and wherein it is liquid sealed and on its interior is provided with cross rails 45 that form the support for the reservoir 5. The bottom wall of the receptacle has a reentrant portion 46 that serves as an abutment for lifting the valve of the reservoir from its seat, and a channel-like partition 47 is applied to the inner side of the peripheral wall of the receptacle and encloses the riser duct 25 which is arranged to overflow directly into the supply pipe 3 through a discharge or outlet opening 48 that is shown as surrounded by a boss that is suitably sealed within the end of said pipe.

In the two embodiments next to be described, the receptacle into which the reservoir discharges is detachably connected directly to the reservoir in register with the discharge opening or mouth thereof.

Referring first to the form illustrated in Figs. 15, 16 and 17, 50 is the receptacle, and the same is provided with an inverted frusto-conical top wall 51 that converges to a relatively small opening 52 that constitutes, in effect, the outlet of the reservoir when the receptacle 50 is inserted within a neck or collar 53 of the latter vessel and attached thereto by a bayonet joint comprising protuberances 54 on the receptacle and L-shaped grooves 55 in the collar, said grooves being so inclined to the axis of the receptacle so as to cause the receptacle to be drawn toward the reservoir when turned and compress between them a packing washer 56. A partition 57 of channel formation is applied to the side wall of the receptacle 50 and encloses the riser duct 25, which has a discharge provided by an outlet opening 58 in the wall of the receptacle.

In this case, the receptacle 50 is applied to the reservoir when the latter is in upright position and then when the reservoir is inverted and placed within the vessel 4, the receptacle 50 assumes operative position and rests with its lower end on the bottom of said vessel. If water is present with the oil in sufficient quantity to stop the flow of the latter, the reservoir may be removed and turned right side up and the liquid in the receptacle, above the frusto-conical top wall thereof, will flow back into the reservoir, care being taken in turning the reservoir upright to swing the receptacle 50 so that oil will not run out of the opening 58. This action permits all of the oil to flow back into the reservoir excepting such as may remain with the water below the plane of the small end of the frusto-conical wall 51. The receptacle may then be removed from the reservoir and emptied through the opening 58.

The modification shown in Figs. 18, 19 and 20 is very much like the one just described excepting that here an arcuate partition 60 flares downwardly from the top wall 61 of the receptacle 62 and has its ends joined to the peripheral wall of the receptacle. The space enclosed by said partition and the adjacent portion of the aforesaid wall communicates with the interior of the reservoir through an opening 63 in the top wall 61 and a discharge opening 64 that constitutes the mouth of the reservoir 5. In other respects, this form of the invention is precisely like the embodiment last described. In the present case the channel-like partition that encloses the riser duct 25 is designated 66; the discharge or outlet opening in the wall of the receptacle is shown at 67, and the protuberances through which the receptacle is attached with a bayonet joint connection to the collar of the reservoir are marked 68.

In the modification illustrated in Fig. 21, the vessel, designated 4ᵇ, that is connected directly to the end of the supply pipe 3ᵇ, constitutes the receptacle into which the reservoir 5 discharges, the bottom wall of said vessel having a reentrant portion 70 that serves as the abutment for the valve stem 10. In this case an inverted U-bend 71 is formed in the supply pipe 3ᵇ to provide the riser duct 25 which discharges at the point designated 72 into the section of the pipe that leads to the burner.

In Fig. 22, the flow control is embodied in a unit designated generally by the reference numeral 75 that is inserted in the feed pipe 3ᶜ between a reservoir 76, in which a constant liquid level is maintained by a float operated valve 77, and a combustion device designated 78. The unit 75 consists of a casing 80 whose interior has a portion divided off to form the riser duct 25 by a partition 81 that extends from near the bottom of the casing to a point therein above the maximum liquid level. In this case the discharge of the riser duct 25 is formed by the outlet opening of the casing that is connected to the adjacent section of the pipe 3ᶜ.

Having thus described my invention, what I claim is:

1. A flow control apparatus for preventing the feeding of a liquid when combined with upwards of a given amount of a heavier liquid, said apparatus comprising a vessel, a conduit leading from the lower portion thereof, a receptacle arranged within said vessel, a reservoir inverted above the receptacle and having its discharge opening arranged to be liquid sealed in said receptacle thereby to establish a liquid level in the receptacle, a riser duct communicating through an inlet at its lower end with the bottom portion of the receptacle, said riser duct having a discharge that opens into the vessel, said discharge being below the said liquid level, the ratio of the vertical distance between said inlet and the discharge to the vertical distance between the inlet and the liquid level being equal to or greater than the ratio of the specific gravity of the lighter liquid to that of the heavier liquid.

2. A flow control apparatus for preventing the feeding of a liquid when combined with upwards of a given amount of a heavier liquid, said apparatus comprising a vessel, a conduit leading from the bottom portion thereof, a receptacle arranged within the vessel and having a discharge that opens into the vessel, a reservoir supported with its discharge opening liquid sealed within the receptacle thereby to establish a liquid level, and a partition dividing the interior of said receptacle into a compartment into which the reservoir discharges and a riser duct in which is located the aforesaid discharge, said riser duct communicating with said compartment through an inlet adjacent the botom of said partition, the lower edge of the discharge being below said liquid level, the ratio of the vertical distance between said inlet and the discharge to the vertical distance between the inlet and the liquid level being equal to or greater than the ratio of the specific gravity of the lighter liquid to that of the heavier liquid.

3. A flow control apparatus for preventing the feeding of a liquid when combined with upwards of a given amount of a heavier liquid, said apparatus comprising an open top vessel, a conduit leading from the lower portion thereof, a cup-like receptacle situated within the bottom of the vessel, reservoir supporting means within the receptacle, a bottle-like reservoir inverted above the receptacle with its neck resting upon the reservoir supporting means, said neck being provided with a discharge opening that is liquid sealed within the receptacle thereby to establish a liquid level, the peripheral wall of the receptacle having an outlet opening whose lower edge is spaced below said liquid level, a vertical partition extending transversely of the receptacle and having its lateral edges engaged within the wall of the receptacle on opposite sides of said outlet opening, said partition extending from a point above the said liquid level to a point adjacent the bottom of the receptacle, the ratio of the vertical distance between the lower edge of said outlet opening and the lower end of said partition to the vertical distance between said end of the partition and said liquid level, being equal to or greater than the ratio of the specific gravity of the lighter liquid to that of the heavier liquid.

4. A flow control apparatus for preventing the feeding of a liquid when combined with upwards of a given amount of a heavier liquid, said apparatus comprising a liquid supply of constant liquid level, and delivery means through which the liquid may flow from said supply, said delivery means including a riser duct having its discharge spaced below the liquid level of said supply and its inlet end spaced below the plane of said discharge, the spacing being such that the ratio of the vertical distance between the inlet end and the discharge to the vertical distance between the inlet end and the liquid level is equal to or greater than the ratio of the specific gravity of the lighter liquid to that of the heavier liquid.

5. In combustion apparatus, the combination of an oil burner, an oil supply of constant liquid level, and delivery means below said level through which the oil flows by gravity to the burner and assumes a level therein corresponding to the liquid level of said supply, the delivery means including a riser duct having its discharge below said liquid level and its inlet end spaced below the plane of said discharge, the spacing being such that the ratio of the vertical distance between said inlet end and the discharge to the vertical distance between the inlet end and the oil level is equal to or greater than the ratio of the specific gravity of oil to that of water.

6. Means preventing the feeding of a liquid when combined with upwards of a given amount of a heavier liquid, the same comprising a receptacle in which the first mentioned liquid is maintained at a constant level, liquid conveying means opening into said receptacle through an inlet at a point a substantial distance below said liquid level, said conveying means including a riser duct having a discharge spaced above the plane of said inlet and below the said liquid level; the ratio of the vertical distance between said inlet and the discharge to the vertical distance between the inlet and the liquid level being equal to or greater than the ratio of the specific gravity of the lighter liquid to that of the heavier liquid.

7. Means preventing the feeding of a liquid when combined with upwards of a given amount of a heavier liquid, the same comprising a receptacle, a reservoir arranged to discharge thereinto and whose discharge opening is sealed by an accumulation of liquid in the receptacle to approximately the level of said discharge opening, liquid conveying means opening into said receptacle through an inlet at a point a substantial distance below said level, and a riser duct in said conveying means having a discharge spaced above said inlet and below the said level; the ratio of the vertical distance between said inlet and the discharge to the vertical distance between the inlet and the liquid level being equal to or greater than the ratio of the specific gravity of the lighter liquid to that of the heavier liquid.

8. In combustion apparatus, the combination of means for maintaining a source of oil at a constant level, an oil burner, oil conveying means leading thereto and communicating through an inlet with the source at a point a substantial distance below said oil level, and a riser duct in said conveying means having a discharge spaced above said inlet and below the said oil level; the ratio of the vertical distance between said inlet and the discharge to the vertical distance between the inlet and oil level being equal to or greater than the ratio of the specific gravity of oil to that of water.

9. A flow control apparatus for preventing the feeding of a liquid when combined with upwards of a given amount of a heavier liquid, said apparatus comprising an open top vessel, a conduit leading from the lower portion thereof, a cup-like receptacle supported within the vessel, the same having an outlet opening in its peripheral wall, means within the receptacle for separating its interior into a receiving compartment and a riser duct that is adapted to discharge through the said opening into the vessel, the riser duct communicating with said compartment through an inlet adjacent the bottom of said means, and a reservoir supported in operative relation to the receptacle and having a discharge opening liquid sealed therein so as to maintain a liquid level within the receptacle above the plane of the lower edge of the aforesaid outlet opening, the ratio of the vertical distance between the said inlet and the outlet opening to the vertical difference between the inlet and the said liquid level being equal to or greater than the ratio of the specific gravity of the lighter liquid to that of the heavier liquid.

10. A flow control apparatus for preventing the feeding of a liquid when combined with upwards of a given amount of a heavier liquid, said apparatus comprising an open top receptacle, a reservoir having a discharge opening, means within the receptacle for supporting the reservoir with its discharge opening liquid sealed within the receptacle so as to maintain a given liquid level therein, the receptacle having an outlet opening in its side, the lower edge of said outlet opening being spaced below said liquid level, a conduit communicating with the outlet opening, and a vertical partition extending from a point above the liquid level to a point adjacent the bottom of the receptacle and having its lateral edges joined to the wall of the receptacle on opposite sides of the outlet opening thereby to provide a riser duct whose inlet is defined by the lower edge of said partition, the ratio of the vertical distance between the said inlet and the outlet opening to the vertical distance between the inlet and the said liquid level being equal to or greater than the ratio of the specific gravity of the lighter liquid to that of the heavier liquid.

11. A flow control apparatus for preventing the feeding of a liquid when combined with upwards of a given amount of a heavier liquid, said apparatus comprising an open top vessel, a conduit leading from the bottom portion thereof, a reservoir having a discharge opening, a receptacle removably applied to the reservoir and having a top wall provided with an opening surrounded by an inwardly extending portion, the latter opening registering with the discharge opening of the reservoir, the reservoir being adapted to be inverted and lowered into the vessel with the receptacle positioned in the bottom thereof and to be liquid sealed by an accumulation of liquid in the receptacle to the height of the said inwardly extending portion thereby to establish a liquid level, the receptacle having an outlet opening in its peripheral wall whose lower edge is spaced below the corresponding edge of the aforesaid inwardly extending portion, and a partition extending from above the aforesaid plane to a point adjacent the bottom of the receptacle and having its lateral edges joined to the peripheral wall of the receptacle on opposite sides of the outlet opening thereby to provide a riser duct whose inlet is defined by the lower edge of said partition, the ratio of the vertical distance between the said inlet and the outlet opening to the vertical distance between the inlet and the plane of the lower edge of the aforesaid inwardly extending portion being equal to or greater than the ratio of the specific gravity of the lighter liquid to that of the heavier liquid.

KARL W. RAUSCH.